Patented Jan. 8, 1935

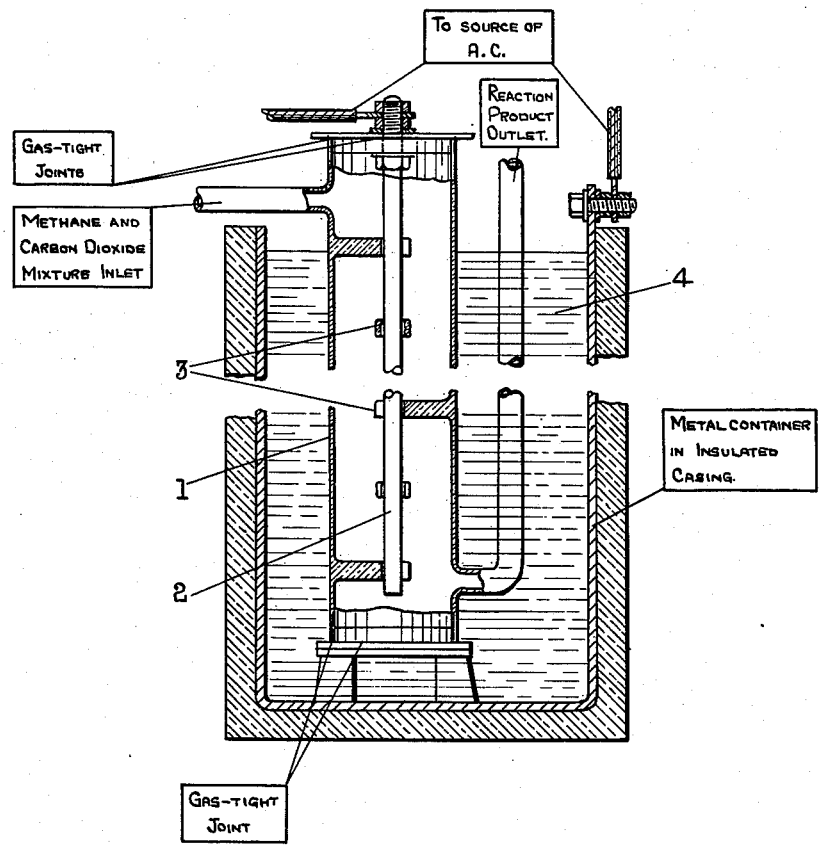

1,986,885

UNITED STATES PATENT OFFICE 1,986,885

MANUFACTURE OF ALIPHATIC ALDEHYDES

Donald Finlayson and John Herbert Geoffrey Plant, Spondon, near Derby, England, assignors to Celanese Corporation of America, a corporation of Delaware Application March 26, 1931, Serial No. 525,594 In Great Britain September 25, 1930

13 Claims. (Cl. 204—31)

The invention relates to the production of aldehydes from gaseous saturated hydrocarbons and carbon dioxide and especially of aldehydes from methane and carbon dioxide.

According to the invention it has been found that aldehydes may be readily produced by subjecting mixtures of gaseous saturated hydrocarbons and carbon dioxide, or a gas containing the same to the action of an electric discharge of the silent, brush, arc or glow type. Thus for instance formaldehyde and/or acetaldehyde can readily be produced by subjecting mixtures of methane and carbon dioxide to the action of the discharges.

In performing the invention mixtures of the hydrocarbon vapour and carbon dioxide or gases containing the same may be subjected to the electric discharge in any convenient way. For instance they may be passed in a stream through a vessel or vessels wherein they are subjected to the discharge or they may be circulated repeatedly through the vessel. In the latter case the gases leaving the vessel may, if desired, be subjected to treatment to remove the aldehyde, for example, condensation, washing or other convenient process prior to returning the gases to the reaction vessel.

The process may, if desired, be performed in the presence of catalysts, for instance silica or other silicious materials, preferably of high specific surface, but very useful results are however obtainable in the absence of catalysts.

The invention is not limited in regard to the temperature to be employed for the reaction. Even at normal temperatures, e. g. about 15–25° C. very satisfactory results are obtained; if desired, however, the reaction may be caused to take place at higher temperatures, for example between 100–500° C. or higher, for example by heating the reaction vessel, and/or preheating the gases.

Moreover, the reaction may be caused to take place under normal pressure or under increased or reduced pressures.

It is to be understood that the invention is not limited as to the relative proportions of carbon dioxide and methane or other saturated hydrocarbon present in the reaction gases or vapours, as these relative proportions may be varied within wide limits. For instance mixtures containing substantially equal molecular proportions of the carbon dioxide and hydrocarbon, or mixtures containing excess of carbon dioxide, e. g., two or more molecular equivalents of $CO_2$ relatively to each molecular equivalent of hydrocarbon may conveniently be employed. The use of equimolecular proportions or of an excess of carbon dioxide is especially advantageous in cases where it is desired to avoid or keep as low as possible formation of higher aldehydes, e. g., to suppress formation of acetaldehyde when applying the invention to the production of formaldehyde from methane. The presence of substantial excess of hydrocarbon, on the other hand, and especially of an amount of hydrocarbon of two or more molecular equivalents relatively to each molecular equivalent of carbon dioxide favours the production of higher aldehydes. Thus for instance in the case of methane and carbon dioxide an excess of methane favours the production of acetaldehyde.

The reaction may be carried out in any convenient form of apparatus. For example there may be employed apparatus wherein the two electrodes are each separated from the reaction gases by a wall or the like of a dielectric such as glass, the reaction gases being caused to pass through the space between the two walls or the like. The electrodes in such form of apparatus may, of course, be immersed in water or other liquid which may contain an ionizing solute such as sulphuric acid. Siemens ozone tubes may be mentioned as an example of such a form of apparatus.

In another type which has been found to give very satisfactory results, the gas mixture is passed through a tube fitted centrally with electrodes of any non-corrodible metal, and surrounded by a jacket containing a liquid such as, for example, water, that acts as the other electrode.

In other types of apparatus the gases may be in contact with the electrodes. For instance, there may be employed apparatus in which the discharge between the two electrodes is passed longitudinally through a tube in which the gases are flowing. Such forms of apparatus may be such that the gases are passed radially across the path of the discharge, or in the same direction as the discharge or pass into the discharge whilst travelling in the same general direction as the same but leave the discharge in a path substantially radial to the same. When a reaction vessel is employed in which the reaction gases are in contact with both electrodes the process is preferably worked under reduced pressure.

If desired the reaction zone may contain catalysts such as hereinbefore indicated.

As above indicated, the use of an excess of hydrocarbon favours the production of higher aldehydes. The intensity of the discharge also acts in a similar manner, the greater the intensity the greater being the tendency to form higher aldehydes. The intensity of the discharge can, of course, be varied by any convenient way, as for instance by altering the supply voltage.

Any convenient means for producing the electric discharge may be used, for example an induction coil. A high tension transformer supplied by any convenient low frequency supply (e. g. of 25 to 1000 or more cycles) has been found to give satisfactory results. Or for instance a high tension alternator (e. g. of 50 to 100 or more cycles) capable of developing the desired high voltage may usefully be employed. Any convenient voltage may be used across the electrodes for example from 10,000 to 100,000 volts or higher.

The methane or other saturated hydrocarbons may be employed for the purposes of the invention in the pure state or in the form of industrial mixtures containing the same, for example coal gas or like commercial gaseous mixture containing methane or other saturated hydrocarbons may usefully be employed for the purposes of the invention.

The following example serves to illustrate a convenient form of execution of the invention, but it is to be understood that the invention is in no way limited thereto.

In the accompanying drawing the figure shows, in part section, a suitable apparatus for use for carrying out the process.

In the figure, 1 indicates a tube, which may be of glass, which contains an electrode 2 concentrically arranged therein and supported by the extensions 3 from the tube 1. The water jacket 4, surrounding tube 1, forms the other electrode.

*Example*

A gas mixture containing about 58% methane and about 33⅓% carbon dioxide is passed through a tube (e. g. of glass) containing a concentrically fitted electrode made of relatively non-corrodible metal, such as staybrite or other chromium nickel steel; the electrode may conveniently be supported concentrically by means of extensions from the wall of the glass tube to the electrode. A water jacket surrounding the glass tube forms the other electrode, ionizing solutes e. g. sulphuric acid being added to the water if desired.

An alternating current potential of about 16,000 volts generated from any convenient low frequency source is applied to the electrodes, for instance the electrodes may be connected to the secondary of a transformer, the primary of which is supplied with alternating current of about 50-100 cycles, the secondary giving an output at about 16,000 volts.

The gases issuing from the tube after being subjected to the discharge may be washed with water or otherwise treated to remove the aldehydes formed, whereafter the gases may be returned for re-circulation to the apparatus, fresh methane and/or $CO_2$ being preferably added to keep the composition of the circulating gases as uniform as possible. The reaction product consists essentially of a mixture of acetaldehyde and formaldehyde containing about 62-63% acetaldehyde.

What we claim and desire to secure by Letters Patent is:—

1. Process for the manufacture of at least one body of formula R.CHO (where R is a hydrogen atom or a methyl group) which comprises subjecting a gaseous mixture comprising methane and carbon dioxide to the action of an electric discharge between electrodes supplied with alternating current of a frequency not substantially exceeding 1000 cycles.

2. Process for the manufacture of at least one body of formula R.CHO (where R is a hydrogen atom or a methyl group) which comprises subjecting a gaseous mixture comprising methane and carbon dioxide to the action of an electric discharge between two electrodes, supplied with alternating current of a frequency not substantially exceeding 1000 cycles at least one of the electrodes being separated from the gas mixture.

3. Process for the manufacture of at least one body of formula R.CHO (where R is a hydrogen atom or a methyl group) which comprises subjecting a gaseous mixture comprising methane and carbon dioxide to the action of an electric discharge between electrodes supplied with alternating current of a frequency not substantially exceeding 1000 cycles at a voltage of about 10,000 to 100,000.

4. Process for the manufacture of aliphatic aldehydes which comprises subjecting a gaseous mixture comprising at least one saturated hydrocarbon and carbon dioxide to the action of an electric discharge between two electrodes, supplied with alternating current at a frequency of about 25 to 100 cycles at a voltage of about 10,000 to 100,000, at least one of the electrodes being separated from the gas mixture.

5. Process for the manufacture of at least one body of formula R.CHO (where R is a hydrogen atom or a methyl group) which comprises subjecting a gaseous mixture comprising methane and carbon dioxide to the action of an electric discharge between two electrodes, supplied with alternating current at a frequency of about 25 to 100 cycles at a voltage of about 10,000 to 100,000, at least one of the electrodes being separated from the gas mixtures.

6. Process for the manufacture of a mixture of acetaldehyde and formaldehyde rich in acetaldehyde, which comprises subjecting a gaseous mixture comprising methane and carbon dioxide to the action of a silent electric discharge of high intensity between electrodes supplied with alternating current of a frequency not substantially exceeding 1000 cycles.

7. Process for the manufacture of a mixture of acetaldehyde and formaldehyde rich in acetaldehyde, which comprises subjecting a gaseous mixture comprising methane and carbon dioxide and rich in methane to the action of a silent electric discharge between electrodes supplied with alternating current of a frequency not substantially exceeding 1000 cycles.

8. Process for the manufacture of a mixture of acetaldehyde and formaldehyde rich in acetaldehyde, which comprises subjecting a gaseous mixture comprising methane and carbon dioxide and rich in methane to the action of a silent electric discharge of high intensity between electrodes supplied with alternating current of a frequency not substantially exceeding 1000 cycles.

9. Process for the manufacture of a mixture of acetaldehyde and formaldehyde rich in formaldehyde, which comprises subjecting a gaseous mixture comprising methane and carbon dioxide to the action of a silent electric discharge of relatively low intensity between electrodes supplied with alternating current of a frequency not substantially exceeding 1000 cycles.

10. Process for the manufacture of a mixture of acetaldehyde and formaldehyde rich in formaldehyde, which comprises subjecting a gaseous mixture comprising methane and carbon dioxide and rich in carbon dioxide to the action of a silent electric discharge between electrodes supplied with alternating current of a frequency not substantially exceeding 1000 cycles.

11. Process for the manufacture of a mixture of acetaldehyde and formaldehyde rich in formaldehyde, which comprises subjecting a gaseous mixture comprising methane and carbon dioxide and rich in carbon dioxide to the action of a silent electric discharge of relatively low intensity between electrodes supplied with alternating current of a frequency not substantially exceeding 1000 cycles.

12. Process for the manufacture of a mixture of aliphatic aldehydes rich in higher aldehydes, which comprises subjecting a gaseous mixture comprising at least one saturated hydrocarbon and carbon dioxide and rich in hydrocarbon to the action of a silent discharge of high intensity between electrodes supplied with alternating current of a frequency not substantially exceeding 1000 cycles.

13. Process for the manufacture of a mixture of aliphatic aldehydes rich in lower aldehydes, which comprises subjecting a gaseous mixture comprising at least one saturated hydrocarbon and carbon dioxide and rich in carbon dioxide to the action of a silent electric discharge of relatively low intensity between electrodes supplied with alternating current of a frequency not substantially exceeding 1000 cycles.

DONALD FINLAYSON.
JOHN HERBERT GEOFFREY PLANT.